(12) United States Patent
Cooper et al.

(10) Patent No.: US 7,572,419 B2
(45) Date of Patent: Aug. 11, 2009

(54) APPARATUS AND METHODS FOR REMOVING MERCURY FROM FLUID STREAMS

(75) Inventors: John Arthur Cooper, Beaverton, OR (US); Sarah Catherine Fry, Beaverton, OR (US); Bruce Edward Johnsen, Tigard, OR (US)

(73) Assignee: Cooper Environmental Services LLC, Portland, OR (US)

(*) Notice: Subject to any disclaimer, the term of this patent is extended or adjusted under 35 U.S.C. 154(b) by 0 days.

(21) Appl. No.: 10/690,785

(22) Filed: Oct. 21, 2003

(65) Prior Publication Data

US 2004/0081606 A1 Apr. 29, 2004

Related U.S. Application Data

(60) Division of application No. 10/269,816, filed on Oct. 11, 2002, now Pat. No. 6,770,250, which is a continuation-in-part of application No. 09/962,177, filed on Sep. 24, 2001.

(51) Int. Cl.
*B01J 8/00* (2006.01)
*B01J 20/22* (2006.01)

(52) U.S. Cl. .................. 423/210; 502/401; 502/402
(58) Field of Classification Search .......... 422/168–183; 423/210; 502/439, 401–402
See application file for complete search history.

(56) References Cited

U.S. PATENT DOCUMENTS

| | | | |
|---|---|---|---|
| 3,194,629 A | 7/1965 | Dreibeibis et al. | |
| 3,447,359 A | 6/1969 | Kapff | |
| 3,791,196 A | 2/1974 | Lepper, Jr. | |
| 3,842,878 A | 10/1974 | De Baun et al. | |
| 3,849,537 A | * 11/1974 | Allgulin | 423/210 |
| 3,888,109 A | 6/1975 | Sharki et al. | |
| 3,892,549 A | 7/1975 | Lyshkow | |
| 3,940,614 A | * 2/1976 | Rhodes et al. | 378/47 |
| 3,956,458 A | 5/1976 | Anderson | |
| 4,036,253 A | 7/1977 | Fegan et al. | |
| 4,094,777 A | 6/1978 | Sugier et al. | |
| 4,101,631 A | * 7/1978 | Ambrosini et al. | 423/210 |
| 4,238,294 A | * 12/1980 | Takeuchi et al. | 203/72 |
| 4,402,916 A | 9/1983 | Luetzelschwab | |
| 4,419,107 A | 12/1983 | Roydhouse | |
| 4,474,896 A | * 10/1984 | Chao | 502/216 |
| 4,500,327 A | 2/1985 | Nishino et al. | |
| 4,566,342 A | 1/1986 | Kurz | |
| 4,578,256 A | 3/1986 | Nishino et al. | |
| 4,679,628 A | 7/1987 | Luetzelschwab | |
| 4,826,775 A | 5/1989 | Burns et al. | |
| 4,903,492 A | 2/1990 | King | |
| 4,917,862 A | 4/1990 | Kraw et al. | |
| 5,090,257 A | 2/1992 | Bruce | |
| 5,209,402 A | 5/1993 | DeBra et al. | |
| 5,220,795 A | 6/1993 | Dodds et al. | |
| 5,226,545 A | * 7/1993 | Foust | 423/99 |
| 5,297,431 A | 3/1994 | White | |
| 5,297,432 A | 3/1994 | Traina et al. | |
| 5,332,512 A | 7/1994 | Wells | |
| 5,423,228 A | 6/1995 | Budd et al. | |
| 5,473,951 A | 12/1995 | Tomlin | |
| 5,546,788 A | 8/1996 | Dickow | |
| 5,569,838 A | 10/1996 | Broedel et al. | |
| 5,596,154 A | 1/1997 | Baughman | |
| 6,200,816 B1 | 3/2001 | Farber et al. | |

FOREIGN PATENT DOCUMENTS

| | | |
|---|---|---|
| EP | 0289809 A1 | 11/1988 |
| GB | 2122916 A | 1/1984 |
| JP | 49-43197 A | 11/1974 |
| JP | 50-6438 A | 3/1975 |
| JP | 75006438 B | * 3/1975 |
| JP | 73038317 B | * 10/1975 |

OTHER PUBLICATIONS

J.A. Cooper et al., "Modification of TRC's Hazardous Element Sampling Train for Mercury Speciation in Utility Flue Gas," TRC Environmental Corp., Tigard, Oregon, Electric Power Research Institute, Palo Alto, California, pp. 1–16.

H.Gutberlet et al., "Behaviour of the Trace Element Mercury in Bituminous Coal Furnaces with Flue Gas Cleaning Plants," Media–Data of VGB Kraftwerkstechnik, Jun. 4, 1991.

Bj rn Hall et al., "Mercury Chemistry in Simulated Flue Gases Related to Waste Incineration Conditions," Environ. Sci. Technol., vol. 24, No. 1, 1990, pp. 108–111.

Nina Bergan French, et al., "State–of–the–Art Mercury CEMs for Hazardous & Mixed Waste Incineration Applications," Environmental Science & Technology and Analytical Chemistry, Feb. 16, 1999, pp. 1–10.

Joseph J. Helble, et al., "Control of Mercury Emissions from Coal–Fired Power Plants, " National Center for Environmental Research, U.S. Environmental Protection Agency, Oct. 31, 2000, http://es.epa.gov/ncerqa–_abstracts/grants/99/enveng/helble.html.

(Continued)

*Primary Examiner*—Glenn Caldarola
*Assistant Examiner*—Tom P Duong
(74) *Attorney, Agent, or Firm*—Goff Patent Law

(57) ABSTRACT

An apparatus and method for removing mercury, and in particular elemental mercury, from a fluid stream by exposing the fluid stream to a polyethersulfone or filter-coated with anion exchange resin, or anion exchange resin-coated surface onto which has been loaded elemental iodine. Elemental iodine is loaded onto the PES or anion exchange resin-coated surface by immersing the PES or anion exchange resin-coated substrate in an iodine/pentane solution, then removing the substrate from the iodine/pentane solution and rinsing in pentane.

14 Claims, No Drawings

OTHER PUBLICATIONS

S.E. Lindberg, et al., "Atmospheric Mercury Speciation : Concentrations and Behavior of Reactive Gaseous Mercury in Ambient Air," Environ. Sci. Technol., vol. 32, No. 1, 1998, pp. 49-57.

Patricio E. Trujillo, et al., "Development of a Multistage Air Sampler for Mercury, " Analytical Chemistry, vol. 47, No. 9, Aug. 1975, pp. 1629-1634.

Yoshimi Matsumura, "Adsorption of Mercury Vapor on the Surface of Activated Carbons Modified by Oxidation or Iodization," Atmospheric Environment, vol. 8, pp. 1321-1327.

John A. Cooper, "Recent advances in sampling and analysis of coal-fired power plant emissions for air toxic compounds," Fuel Processing Technology, vol. 39, 1994, pp. 251-258.

S.V. Krishnan, et al., "Sorption of Elemental Mercury by Activated Carbons," Environ. Sci. Technol., 1994, 28, pp. 1506-1512.

Babu R. Nott, et al., "Evaluation and Comparison of Methods for Mercury Measurement in Utility Stack Gas," Elec. Power Res. Inst, Palo Alto, CA, U.S. Environ. Prot. Agen., Research Triangle Park, NC, Radian Corp., Austin, TX, Deeco, Inc., Cary, NC, Frontier Geosciences, Seattle, WA, Mass. Inst. Of Technol., Cambridge, MA, Chester Environ., Tigard OR, pp. 1-15.

* cited by examiner

APPARATUS AND METHODS FOR REMOVING MERCURY FROM FLUID STREAMS

CROSS-REFERENCE TO RELATED APPLICATION

This application is a divisional of U.S. patent application Ser. No.10/269,816, filed on Oct. 11, 2002 now U.S. Pat. No. 6,770,250 which is a continuation-in-part of U.S. application Ser. No. 09/962,177, filed on Sep. 24, 2001. The priority of these prior applications is expressly claimed and their disclosures are hereby incorporated by referenced in their entirety.

BACKGROUND OF THE INVENTION

This invention relates to the removal of mercury (Hg) from gas streams, and in particular, to an apparatus and method for removing Hg, and in particular, elemental Hg from gas streams.

Mercury is a neurotoxin, which when emitted into the environment is of concern for both the health of man and other components of the biosphere. Even though the concentration of mercury in the atmosphere is low, it can be accumulated in the food chains of man and other species. The degree of environmental availability is dependent in part on the chemical form of mercury. Because of the widely recognized health impacts of this element, it has been identified as a key pollutant to be controlled. Some countries and states have banned the use of mercury in industrial processes, and the use of products containing mercury. As such, reduction of the amount of mercury from sources such as products like batteries and fluorescent light bulbs, and the emission of mercury from sources such as industrial processes, incineration, land fills and boilers is critical.

As mercury emission limits become more stringent, analytical methods capable of detecting ever lower mercury levels are required. In some cases, the required sensitivity exceeds that which can be achieved with known analytical methods. As a result, these measuring methods frequently require pre-concentration of the mercury-containing gas stream prior to analysis in order to measure low concentrations of mercury in typical gas streams.

To further complicate matters, mercury and some of its readily-formed compounds are relatively volatile. For example, mercury readily combines with chloride to form mercuric chloride ($HgCl_2$). However, both elemental mercury and mercuric chloride have high vapor pressures at typical ambient and in-stack temperatures. As such, both elemental mercury and mercuric chloride vapor are difficult to remove from a gas stream for emissions control and/or subsequent analysis.

For all of these reasons, removal of mercury from gas streams has been extensively studied, and numerous methods have been reported that purport to effectively remove elemental mercury and mercury compounds from gas streams.

Mercury's propensity to combine with iodine has led to numerous efforts to remove mercury from gas streams by combining the Hg with iodine in some form. For example, Japanese patent JP 49-43197 teaches the removal of mercury from alkali electrolysis cell gas by contacting the gas with an iodide of Li, K, Ca, Mg, Zn, Al, Fe, Ni, or Co, or a compound of the general formula $R_4NI$, where R is H or 1–4C alkyl containing no free $I_2$, and which also includes at least one inorganic reducing agent. The carrier is carbon, a zeolite or silica gel.

JP 50-6438 teaches removal of Hg from gas streams by contacting the gas stream with a cationic exchange resin on which is adsorbed an iodide of Al, Zn, Sr, Fe, Na, Ni, Mg, Li, tetracthylamonium, methylene, naphthalene, o-phenol or benzene. Iodine is optionally loaded onto the resin in addition to the iodide compound.

U.S. Pat. No. 4,474,896 discloses an absorbent for mercury that is a polysulfide-containing adsorbent composition. In one embodiment, the adsorbent is a zeolite that has been treated to contain metal cation capable of forming insoluble polysulfides when exposed to sulfanes in either vapor form or in an organic solution.

While each of these methods is somewhat successful in removing Hg from gas streams, none is capable of doing so quantitatively; i.e., at low concentrations that might be present down stream at mercury controls and capture the mercury in a form that might be applicable to nondestructive analysis procedures such as x-ray fluorescence. As a result, none of these known methods are suitable for Hg removal to the levels required for either thoroughly removing Hg from a process or waste gas stream, for control of emissions, or for quantitative analysis of mercury-containing vapors in a gas stream.

SUMMARY OF THE INVENTION

It is therefore an object of this invention to provide a composition and method capable of removing mercury vapor from a gas stream.

It is another object of the invention to provide a composition and method to remove volatile mercury-containing compounds from a gas stream.

It is yet another object of the invention to provide a composition and method of removing volatile mercury and mercury-containing compounds from a gas stream in a quantitative manner.

It is still another object of the invention to provide a composition and method of removing all mercury species from a gas stream, including elemental mercury vapor and volatile and particulate mercury-containing compounds, in particular compounds containing oxidized mercury.

These and other objects of the invention are met by preferred embodiments of the invention in which a polyethersulfone (PES) filter substrate is provided, and onto which elemental iodine is loaded, and PES filter substrate with anion exchange resin coating onto which elemental iodine is loaded and other filter substrates with anion exchange resin coatings onto which elemental iodine is loaded

DETAILED DESCRIPTION OF THE INVENTION

The present invention is embodied in a composition including a polyethersulfone (PES) filter surface onto which has been loaded elemental iodine, PES and other filter surface coated with anion exchange resins onto which has been loaded elemental iodine, methods for loading elemental iodine onto these surfaces for use in removing mercury from a gas stream, and methods of collecting mercury in a gas stream and immobilizing the mercury on these filter surfaces. In one embodiment, the iodine is loaded onto the PES substrate by treating the substrate with a solution of iodine and pentane, then rinsing and drying the PES substrate. It has been discovered that a PES surface thus treated will remove over 99% of the mercury from a gas stream under certain conditions. In a preferred embodiment, the iodine is loaded onto a PES filter substrate coated with anion exchange resin and will remove 99% of the mercury from a coal-fired power plant exhaust over a wide range of operating conditions. The invention has utility in many areas since it can be used to treat a process gas stream, a discharge gas stream prior to discharging it to the environment, to pre-concentrate the mercury in a gas stream for subsequent analysis, or to determine the chemical and/or physical form of mercury in a gas stream.

In one preferred embodiment, the substrate is a polyethersulfone filter paper, such as Pall Corporation Mustang Q or SB6407, which has been coated with a strongly basic chloride form of quaternary amine ion exchange resin. The substrate is treated with a 0.0079M solution of iodine in anhydrous pentane. To form the treating solution, iodine is dissolved in the pentane at a rate of 1 gram of iodine per 1000 ml of anhydrous pentane. The iodine/pentane solution is then drawn through the filter paper. The filter is then rinsed in pure pentane and dried. In other embodiments, the filter paper can be immersed in the solution. In other embodiments using this and other forms of filter material, the substrate can also be immersed in the pentane/iodine solution for sufficient time to ensure saturation of the filter matrix and exposure of the entire surface of the filter material to the treating solution. The filter material is then removed from the treating solution and rinsed in anhydrous pentane, and then dried. The filter material is then ready for use by being exposed to the mercury-containing gas stream. The invention is not intended to be limited to any particular form of filtering material, or any particular solvent, or any particular anion exchange resin. For example, other embodiments include PES or other anion exchange AER-coated filter tapes, woven materials, fibrous mats, solid sheets, porous solids, having interstitial surfaces with a passageway membranes, powders, and other solvents, such as ethanol, hexane, etc.

While the precise mechanism by which the treated filter substrate and iodine interact is not known at this time, it is believed that the invention results in elemental iodine being held on a substrate in such a way that when the treated substrate is placed in a gas stream containing mercury (particulate, oxidized vapor and elemental vapor), the mercury reacts with the bound iodide or iodine. In this application the term "chemisorbed" is used to describe the attachment of iodine to the treated filter surface. The term is used to indicate that iodine is held or bonded to the treated filter surface such that it is not removed by rinsing the substrate in pentane, in which iodine is soluble. Chemisorbed is not intended to be interpreted in an overly restrictive manner to indicate any specific reaction or bonding strength to the surface. The reaction product, which is believed to be mercuric or mercurous iodide, remains bound to the iodine-treated substrate, thereby removing and immobilizing the previously vapor phase mercury.

Table 1 demonstrates the effectiveness of a filter paper treated according to the foregoing method. In each case, the filter material was exposed to coal-fired utility boiler exhaust gas streams at flow rates varying from 0.24 to 1.02 l/min/cm$^2$ in which elemental mercury vapor concentration varied between 42 and 304 micrograms per cubic meter. In similar laboratory tests, untreated filters had elemental mercury trapping efficiencies of less than one percent.

TABLE 1

Elemental Mercury Trapping Efficiency in Coal-Fired Utility Boiler Exhaust

| Test Run No. | Filter Type | Temp. °F. | Time Min. | Flow lpm/cm$^2$ | Volume m$^3$/cm$^3$ | Trapping Effic. (%) | Conc. Hg/m$^3$ |
|---|---|---|---|---|---|---|---|
| 1 | Treated SB6407 | 183 | 21 | 0.52 | 0.011 | >99 | 98 |
| 2 | Treated SB6407 | 185 | 20 | 0.98 | 0.020 | >99 | 62 |
| 3 | Treated SB6407 | 185 | 30 | 1.01 | 0.030 | >99 | 42 |
| 4 | Treated SB6407 | 183 | 60 | 0.24 | 0.015 | >99 | 304 |
| 5 | Treated SB6407 | 185 | 60 | 0.52 | 0.031 | >99 | 132 |
| 6 | Treated SB6407 | 184 | 60 | 0.74 | 0.044 | >99.4 | 113 |
| 7 | Treated SB6407 | 185 | 60 | 1.02 | 0.061 | >99.7 | 53 |

Referring to Table 2 below a filter according to the present invention was compared to the industry standard for speciation of mercury known as the Ontario Hydro method. Recall that mercury often occurs in multiple oxidation states simultaneously in environments such as stack gases. A filter assembly according to the present invention was tested to determine its correspondence to the Ontario Hydro method of speciation of mercury species. As can be seen from Table 2, a filter assembly according to the invention (Mercury Speciation Cartridge) corresponds favorably to the Ontario Hydro standard method for mercury speciation.

TABLE 2

Comparison with Ontario Hydro

| Run No. | Hg Form | Conc. μg/m$^3$ | Mercury Speciation Cartridge % | Ontario Hydro % |
|---|---|---|---|---|
| 1 | Chloride | 46.6 | 87.4 | 88.4 |
|   | Elemental | 6.7 | 12.6 | 11.6 |
| 2 | Chloride | 129.2 | 98.3 | 97.4 |
|   | Elemental | 2.2 | 1.7 | 2.6 |

The enhanced ability of the present invention to remove elemental mercury as detailed in Table 1 is achieved without reducing the trapping efficiency of the filter material to remove oxidized mercury species such as mercuric chloride. Referring to Table 3 below, Test No.'s 1 and 2 show results of tests using Pall SB6407 filter paper that had been treated according to the present invention, while Test No. 3 shows the results using untreated Pall SB6407 filter paper. The results shown in Table 3 demonstrate that a filter assembly and method according to this invention provides significantly greater removal efficiency for elemental mercury with no decrease in trapping efficiency for oxidized mercury. The fact that the untreated filter has low trapping efficiency (<1%) for elemental mercury and high (>99%) trapping efficiency for oxidized mercury, while the treated filter has high elemental mercury trapping efficiency is the basis for the mercury speciation test results listed in Table 2 above.

TABLE 3

Mercuric Chloride Trapping Efficiency

| Test No. | Time (Min.) | Treated | Efficiency (%) | Conc. (µg/m3) |
|---|---|---|---|---|
| 1 | 10 | Yes | 99.7 | 765 |
| 2 | 20 | Yes | 99.7 | 748 |
| 3 | 20 | No | 99.8 | 574 |

The embodiment described is just one embodiment of the invention. The invention can be applied in many different forms depending on the condition or characteristics of the gas stream, the economics of a particular application, and the objectives of the application. For example, the invention can be used in separation processes including any of filtration, diffusion, filtration and diffusion in combination. The invention can also be implemented by injection of PES-I or anion exchange resin-coated filter-I powder into a fluid stream followed by removal of the PES-I or anion exchange resin-coated filter-I powder by filtration, impaction or liquid impingers. The invention is effective for mercury removal at conditions typically associated with coal-fired power plants (Table 1), gas-fired power plants, incinerators, natural gas purification processes, land fill gas emissions, and many other thermal and chemical processing environments. The methods of the invention can be used for continuous emission monitoring, for intermittent sampling, for removing mercury from a gas stream, for pre-concentration of mercury for analysis, including quantitative analysis. The selectivity of the present invention toward elemental mercury enables the speciation of mercury as well (Table 2). Several additional embodiments will now be described, each of which utilizes the invention for removing vapor-phase mercury.

In one preferred embodiment that is particularly well-suited for continuous emission monitoring, the filter material is in the form of a tape. The tape is intermittently advanced and a fresh "frame" of the tape is exposed to the gas stream. After exposure to the gas stream, the "frame" of the filter tape material is transferred to an analytical chamber where the amount of mercury on the tape is determined which, when combined with the volume sampled, is used to calculate the mercury concentration in the gas. This information is then stored or transmitted for determination of compliance with regulatory standards, or for use in process control.

In another embodiment, a gas stream containing oxidized mercury particulates, oxidized mercury vapor, and elemental vapor-phase mercury is treated to remove the mercury, and at the same time to provide information on mercury speciation. Speciation refers to the process of not only determining the total amount of mercury, but the amounts of mercury in different oxidation states. In this embodiment, the stream is first passed through an inert filter such as a glass fiber filter to remove the particulate oxidized mercury. The stream is then passed through an untreated PES or untreated anion exchange resin-coated filter to remove the vapor-phase oxidized mercury. The stream is then passed through a PES or anion exchange resin-coated filter onto which elemental iodine has been loaded as described above. Passing the stream through this filter removes elemental mercury as described above. The filters are then analyzed to determine the amount of mercury collected on each, and the amounts are summed to determine the total mercury in the stream. This method is useful for continuous emission monitoring, for intermittent sampling (such as EPA reference method #29), and for the "Ontario Hydro" method. The method can provide information on total mercury content, and also for mercury speciation.

In another embodiment, a gas stream containing oxidized mercury particulates, oxidized mercury vapor, and elemental vapor-phase mercury is first introduced into a denuder having an untreated PES or anion exchange resin-coated filter surface to remove the vapor-phase oxidized mercury. The stream is then introduced through a diffusion denuder having PES or anion exchange resin-coated filter surfaces onto which elemental iodine has been loaded according to methods of the present invention, and which remove the elemental mercury vapor. Finally, the stream is passed through an inert filter to remove the mercury particulates. Each denuder and the inert filter are analyzed for the amount of mercury collected on each, which can be summed to provide a total mercury analysis of the stream.

The foregoing embodiments are intended as illustrative of certain embodiments of the invention, and are not intended to be limiting. Those skilled in the art will recognize that additional sampling, analytical and gas cleaning methods that embody the present invention are possible.

What is claimed is:

1. An apparatus for removing mercury from a gas stream, the apparatus comprising:

a polyethersulfone surface or a surface coated with an anion exchange resin;

and, elemental iodine disposed on a surface thereof.

2. An apparatus according to claim 1 wherein the elemental iodine disposed on the polyethersulfone or resin-coated surface is chemisorbed thereon.

3. An apparatus according to claim 2 wherein the polyethersulfone or resin-coated surface is selected from the group consisting of external surfaces and interstitial surfaces.

4. An apparatus according to claim 1 wherein the elemental iodine is deposited on the polyethersulfone or resin-coated surface by applying a solution of an organic fluid and elemental iodine to the polyethersulfone surface.

5. An apparatus according to claim 4 wherein the solution of pentane and elemental iodine comprises elemental iodine dissolved in pentane at a ratio of at least 0.001 moles per liter.

6. An apparatus according to claim 4 wherein the solution of pentane and elemental iodine comprises elemental iodine dissolved in pentane at a ratio of at least 0.01 moles per liter.

7. An apparatus according to claim 4 wherein the solution of pentane and elemental iodine comprises elemental iodine dissolved in pentane at a ratio of between 0.01 and 0.10 moles per liter.

8. An apparatus according to claim 4 wherein the solution of pentane and elemental iodine comprises elemental iodine dissolved in pentane at a ratio of about 0.0079 moles per liter.

9. An apparatus according to claim 4 wherein after immersing the polyethersulfone or ion exchange resin-coated substrate in a solution of pentane and elemental iodine the polyethersulfone or ion exchange resin-coated substrate is then rinsed in pentane.

10. An apparatus according to claim 1 wherein the temperature of the gas stream is up to about 300° F.

11. An apparatus according to claim 1 wherein the polyethersulfone or resin-coated surface is a surface of a substrate wherein the substrate is selected from the group consisting of woven material, a fibrous mat, a porous solid, a non-porous solid, and a finely divided solid.

12. An apparatus according to claim 11 wherein the substrate is a porous solid defining passageways through the solid, and wherein the passageways include at least one polyethersulfone or resin-coated surface.

13. An apparatus according to claim 1 which further comprises:
- a chamber including a substrate support, a gas inlet and a gas outlet; and,
- the polyethersulfone or resin-coated surface with the iodine disposed thereon disposed within the chamber.

14. An apparatus according to claim 1 wherein the polyethersulfone or Anion exchange resin-coated surface is a surface of a substrate wherein the substrate is selected from the group consisting of filter paper, filter tape, and a membrane.

* * * * *